US006482778B2

(12) United States Patent
Tersigni et al.

(10) Patent No.: US 6,482,778 B2
(45) Date of Patent: *Nov. 19, 2002

(54) ZINC AND PHOSPHORUS CONTAINING TRANSMISSION FLUIDS HAVING ENHANCED PERFORMANCE CAPABILITIES

(75) Inventors: Samuel H. Tersigni, Richmond, VA (US); Sanjay Srinivasan, Midlothian, VA (US); David L. Strait, Ashland, VA (US)

(73) Assignee: Ethyl Corporation, Richmond, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,309

(22) Filed: Aug. 11, 1999

(65) Prior Publication Data

US 2002/0032129 A1 Mar. 14, 2002

(51) Int. Cl.⁷ ............... C10L 141/06; C10L 141/10; C10L 141/12; C10M 137/06
(52) U.S. Cl. ............... 508/188; 508/228; 508/408; 508/418; 508/518; 508/531; 252/75; 252/76; 252/78.5
(58) Field of Search ............... 508/188, 228, 508/372, 376, 377, 408, 418, 518, 531; 252/75, 76, 78

(56) References Cited

U.S. PATENT DOCUMENTS

| 3,502,677 A | 3/1970 | Le Suer |
| 3,843,542 A | 10/1974 | Adams |
| 4,101,429 A | * 7/1978 | Birke |
| 4,163,729 A | 8/1979 | Adams |
| 4,179,389 A | 12/1979 | Mann |
| 4,704,216 A | 11/1987 | Hata et al. ............ 252/32 |
| 4,786,423 A | 11/1988 | Schroeder ............ 252/32 |
| 4,897,209 A | 1/1990 | Law et al. ............ 252/32 |
| 5,064,546 A | 11/1991 | Dasai ............ 252/32 |
| 5,110,488 A | 5/1992 | Tipton et al. |
| 5,198,133 A | 3/1993 | Papay |
| 5,241,003 A | 8/1993 | Degonia et al. |
| 5,348,671 A | 9/1994 | Horodysky et al. ............ 252/32 |
| 5,516,440 A | 5/1996 | Dasai et al. ............ 252/32 |
| 5,750,477 A | 5/1998 | Sumiejski et al. ............ 508/331 |
| 5,792,731 A | 8/1998 | Ichibashi ............ 508/322 |

FOREIGN PATENT DOCUMENTS

| EP | 220426 | * 5/1987 |
| EP | 237804 | * 9/1987 |
| EP | 281 060 | * 9/1988 |
| EP | 258 400 B1 | * 5/1993 |
| EP | 0713907 A2 | 5/1996 |
| EP | 0761805 A2 | 3/1997 |
| EP | 769 546 A2 | * 4/1997 |
| EP | 0 798 367 | 10/1997 |
| JP | 10017882 A | * 1/1998 |
| WO | WO 97/14770 | 4/1997 |
| WO | WO 97/14773 | 4/1997 |

OTHER PUBLICATIONS

US 4,800,029, 1/1989, Dasai (withdrawn)

* cited by examiner

*Primary Examiner*—Margaret Medley
(74) *Attorney, Agent, or Firm*—Dennis H. Rainear

(57) ABSTRACT

Transmission fluid compositions comprising a zinc detergent and at least one phosphorus-containing additive have enhanced performance capabilities. The use of the zinc detergent and the phosphorus-containing additive provide transmission fluids that exhibit high steel-on-steel coefficients of friction, particularly useful in continuously variable transmissions (CVT).

18 Claims, No Drawings

ZINC AND PHOSPHORUS CONTAINING TRANSMISSION FLUIDS HAVING ENHANCED PERFORMANCE CAPABILITIES

TECHNICAL FIELD

This invention relates to transmission fluid compositions comprising a zinc detergent and at least one phosphorus-containing additive having enhanced performance capabilities, including high steel-on-steel coefficients of friction, under conditions similar to those experienced by transmission systems.

BACKGROUND

There is worldwide activity by automobile manufacturers to develop continuously variable transmissions (CVT). These developments are being driven by benefits from CVTs towards Corporate Average Fuel Economy (CAFE) requirements in the U.S.A.

The advent of ECCC and continuously variable transmissions (CVT) and the manufacturing of passenger cars with smaller transmissions which tend to operate with higher energy densities and higher operating temperatures have challenged lubricant suppliers to formulate transmission fluids with new and unique performance characteristics including higher torque.

CVTs can provide improved fuel efficiency, reduced exhaust emissions and improved driving performance compared to conventional automatic transmissions. The CVT is significantly different from a conventional automatic transmission in several ways. A major feature of the CVT is the transmission of high torque between a steel belt and pulleys providing a continuously variable gear ratio between the input and output shafts. In order to realize high torque transmission between a steel belt and pulleys, high friction between metal/metal contacts is required with normal wear. Loss of transmitting torque between the belt and the pulleys leads to inefficiency and could result in damage to the CVT. A CVT fluid that can transmit high torque generates a high friction force, and, as a result, the belt and the pulleys transmit high torque efficiently. Some CVTs employ a torque converter with an electronically controlled lock-up clutch engaging at low vehicle speeds for further gains in fuel economy and drivability. Acceptable metal/clutch material frictional properties are also required of the CVT fluid when torque converters with a lock-up clutch are used with the CVT.

U.S. Pat. No. 4,897,209 discloses lubricating compositions comprising metal dihydrocarbylaromatic sulfonates and a dialkyl or trialkyl phosphite, wherein the metals are taught to be calcium, barium, sodium, magnesium and lithium. This reference fails to teach transmission fluids containing mixtures of zinc detergents and at least one phosphorus-containing compound or the increased steel-on-steel coefficients of friction obtained by using the fluids of the present invention.

SUMMARY OF THE INVENTION

In accordance with this invention there is provided, in one of its embodiments, a transmission fluid comprising a zinc detergent and at least one phosphorus-containing additive.

In another embodiment of the present invention, a method of increasing steel-on-steel friction in continuously variable transmissions is set forth. Said method comprises adding to, and operating in, a continuously variable transmission a fluid comprising (1) a major amount of a base oil and (2) a minor amount of an additive composition which comprises (A) a zinc detergent and (B) at least one phosphorus-containing additive, wherein the transmission fluid contains from about 10 to about 500 parts by weight of zinc per million parts by weight of transmission fluid (ppm w/w), preferably about 20 to 300 ppm w/w of zinc and more preferably from about 30 to about 100 ppm w/w zinc, and from about 50 to about 2000 ppm w/w, preferably 100 to 1000 ppm w/w of phosphorus, and more preferably from about 200 to 800 ppm w/w of phosphorus.

Another embodiment of the present invention is directed to an automotive transmission lubricated with the transmission fluids of the present invention.

DETAILED DESCRIPTION

The transmission fluids of the present invention comprise a major amount of a base oil and a minor amount of an additive composition which comprises (A) at least one zinc detergent and (B) at least one phosphorus-containing additive.

The zinc detergents useful in this invention are exemplified by oil-soluble neutral or overbased salts of zinc with one or more of the following acidic substances (or mixtures thereof): sulfonic acids, carboxylic acids, salicylic acids, alkyl phenols, and sulfurized alkyl phenols.

Oil-soluble neutral zinc-containing detergents are those detergents that contain stoichiometrically equivalent amounts of zinc in relation to the amount of acidic moieties present in the detergent. Thus, in general the neutral zinc detergents will have a low basicity when compared to their overbased counterparts. The neutral zinc detergents most useful in the present invention include zinc sulfonates, zinc carboxylates, zinc salicylates, zinc phenates and sulfurized zinc phenates and mixtures thereof.

Overbased zinc detergents may be formed by reaction between a neutral zinc detergent and a metal hydroxide. This reaction typically takes place using carbon dioxide in the presence of a promoter, which is generally an alcohol-type material. The promoter dissolves a small amount of metal hydroxide, which is subsequently reacted with carbon dioxide to form a metal carbonate. The amount of metal carbonate incorporated into the overbased detergents can vary depending upon the application in which the overbased detergent is used.

The preferred zinc detergents for use in the present invention include zinc sulfonates. The zinc sulfonates suitable for use in the present invention include zinc dihydrocarbyl aromatic sulfonates such as zinc dialkylnaphthalene sulfonate. The zinc dialkylnaphthalene sulfonate has a sulfonate group attached to one ring of the naphthalene nucleus and an alkyl group attached to each ring. Each alkyl group can independently contain from about six to about twenty carbon atoms, but it is preferred that they contain from about eight to twelve carbon atoms. The dialkylnaphthalene sulfonate group is attached to the zinc through the sulfonate group. A particularly preferred zinc dialkylnaphthalene sulfonate is zinc dinonylnaphthylene sulfonate available commercially as NA-SUL® ZS from King Industries, Inc.

The zinc detergents useful as component (A) in the present invention may also include mixtures of detergents such as blends of zinc sulfonates and zinc carboxylates in a ratio of zinc sulfonate to zinc carboxylate of from about 1:3 to about 3:1 parts by weight. Said blends are available commercially from King Industries, Inc. under the tradename NA-SUL® ZS-HT.

As is well known, overbased metal detergents are generally regarded as containing overbased quantities of inorganic bases, probably in the form of micro dispersions or colloidal suspensions. Thus the term "oil soluble" as applied to the zinc detergents is intended to include zinc detergents that are not necessarily completely or truly oil-soluble, in as much as such detergents when mixed into base oils behave in much the same way as if they were fully and totally dissolved in the base oil.

In one embodiment of the present invention, component (A) is present in an amount sufficient to provide at least 10% by weight of the total zinc content of the fluid. In a preferred embodiment of the present invention, component (A) provides substantially all of the zinc to the finished fluid. The term "substantially all of the zinc to the finished fluid" herein means that greater than 50% of the total zinc, preferably greater than 75% of the total zinc, more preferably greater than 90% of the total zinc, and most preferably 100% of the total zinc content in the finished transmission fluid is provided by component (A).

Component (B) comprises at least one oil-soluble phosphorus-containing additive. Preferred phosphorus-containing additives include phosphate esters, acid phosphate esters, phosphite esters, acid phosphite esters, amine salts of the esters and phosphorus-containing ashless dispersants.

Representative phosphate esters include tributyl phosphate, trihexyl phosphate, tri-2-ethylhexyl phosphate, tridecyl phosphate, trilauryl phosphate, trimyristyl phosphate, tripalmityl phosphate, tristearyl phosphate, trioleyl phosphate, and other $C_3$–$C_{30}$ phosphate esters, tricresyl phosphate, and other $C_6$–$C_{30}$ aryl phosphate esters, and mixtures thereof.

Examples of phosphite esters include tributyl phosphite, trihexyl phosphite, tri-2-ethylhexyl phosphite, tridecyl phosphite, trilauryl phosphite, trimyristyl phosphite, tripalmityl phosphite, tristearyl phosphite, trioleyl phosphite, and other $C_3$–$C_{30}$ phosphite esters, tricresyl phosphite, and other $C_6$–$C_{30}$ aryl phosphite esters, and mixtures thereof.

Representative acid phosphate esters include mono- or dibutyl hydrogen phosphate, mono- or dipentyl hydrogen phosphate, mono- or di-2-ethylhexyl hydrogen phosphate, mono- or dipalmityl hydrogen phosphate, mono- or dilauryl hydrogen phosphate, mono- or distearyl hydrogen phosphate, mono- or dioleyl hydrogen phosphate, and other $C_3$–$C_{30}$ alkyl or alkenyl acid phosphates, mono- or dicresyl hydrogen phosphate, and other $C_6$–$C_{30}$ aryl acid phosphates, and mixtures thereof.

Suitable acid phosphite esters inlcude mono- or dibutyl hydrogen phosphite, mono- or dipentyl hydrogen phosphite, mono- or di-2-ethylhexyl hydrogen phosphite, mono- or dipalmityl hydrogen phosphite, mono- or dilauryl hydrogen phosphite, mono- or distearyl hydrogen phosphite, mono- or dioleyl hydrogen phosphite, and other $C_3$–$C_{30}$ alkyl or alkenyl acid phosphites, mono- or dicresyl hydrogen phosphite, and other $C_6$–$C_{30}$ aryl acid phosphites, and mixtures thereof.

The above mentioned esters may form amine salts with a mono-, di- or trisubstituted amine. Examples of suitable amines include butylamine, pentylamine, hexylamine, cyclohexylamine, octylamine, laurylamine, stearylamine, oleylamine, benzylamine, dibutylamine, dipentylamine, dihexylamine, dicyclohexylamine, dioctylamine, dilaurylamine, distearylamine, dioleylamine, dibenzylamine, stearyl monoethanolamine, decyl monoethanolamine, hexyl monopropanolamine, benzyl monoethanolamine, phenyl monoethanolamine, tolyl monoethanolamine, tributylamine, triphenylamine, triheyxlamine, tricyclohexylamine, trioctylamine, trilaurylamine, tristearylamine, trioelylamine, tribenzylamine, dioleyl monoethanolamine, dilauryl monopropanolamine, dioctyl monoethanolamine, dihexyl monopropanolamine, dibutyl monopropanolamine, oleyl diethanolamine, stearyl dipropanolamine, lauryl diethanolamine, octyl dipropanolamine, butyl diethanolamine, benzyl diethanolamine, phenyl diethanolamine, tolyl dipropanolamine, xylyl diethanolamine, triethanolamine, and tripropanolamine, and mixtures thereof.

The phosphorus-containing ashless dispersants may be formed by phosphorylating an ashless dispersant having basic nitrogen and/or at least one hydroxyl group in the molecule, such as a succinimide dispersant, succinic ester dispersant, succinic ester-amide dispersant, Mannich base dispersant, hydrocarbyl polyamine dispersant, or polymeric polyamine dispersant, and mixtures thereof.

The various types of ashless dispersants described above can be phosphorylated by procedures described in U.S. Pat. Nos. 3,184,411; 3,342,735; 3,403,102; 3,502,607; 3,511,780; 3,513,093; 3,513,093; 4,615,826; 4,648,980; 4,857,214 and 5,198,133.

In one embodiment, the phosphorus-containing dispersants of the present invention are also boronated. Methods that can be used for boronating (borating) the various types of ashless dispersants described above are described in U.S. Pat. Nos. 3,087,936; 3,254,025; 3,281,428; 3,282,955; 2,284,409; 2,284,410; 3,338,832; 3,344,069; 3,533,945; 3,658,836; 3,703,536; 3,718,663; 4,455,243; and 4,652,387. Preferred procedures for phosphorylating and boronating ashless dispersants are set forth in U.S. Pat. Nos. 4,857,214 and 5,198,133.

Component (B) is present in an amount sufficient to provide at least about 50 ppm w/w of phosphorus, preferably from about 50 to 2000 ppm w/w of phosphorus to the fluid.

The transmission fluids of the present invention may further include at least one member selected from the group consisting of dispersants, friction modifiers, viscosity index improvers, alkali metal detergents, alkaline-earth metal detergents, seal swell agents, antioxidants, corrosion inhibitors, foam inhibitors, copper corrosion inhibitors, sulfur and/or phosphorus-containing anti-wear/extreme pressure additives, lubricity agents, and dyes.

The transmission fluid compositions of the present invention typically contain at least one ashless dispersant having basic nitrogen and/or at least one hydroxyl group in the molecule, such as a succinimide dispersant, succinic ester dispersant, succinic ester-amide dispersant, Mannich base dispersant, hydrocarbyl polyamine dispersant, or polymeric polyamine dispersant. The dispersants suitable for use in the present invention include non-phosphorus-containing dispersants, the phosphorus-containing dispersants decribed above as well as mixtures of phosphorus and non-phosphorus-containing dispersants.

Polyamine succinimides in which the succinic group contains a hydrocarbyl substituent containing at least 30 carbon atoms are described for example in U.S. Pat. Nos. 3,172,892; 3,202,678; 3,216,936; 3,219,666; 3,254,025; 3,272,746; and 4,234,435. The alkenyl succinimides may be formed by conventional methods such as by heating an alkenyl succinic anhydride, acid, acid-ester, acid halide, or lower alkyl ester with a polyamine containing at least one primary amino group. The alkenyl succinic anhydride may be made readily by heating a mixture of olefin and maleic anhydride to, for example, about 180–220° C. The olefin is preferably a polymer or copolymer of a lower monoolefin such as ethylene, propylene, 1-butene, isobutene and the like and mixtures thereof. The more preferred source of alkenyl group is from polyisobutene having a gel permeation chromatography (GPC) number average molecular weight of up to 10,000 or higher, preferably in the range of about 500 to about 2,500, and most preferably in the range of about 800 to about 1,200.

As used herein the term "succinimide" is meant to encompass the completed reaction product from reaction between one or more polyamine reactants and a hydrocarbon-substituted succinic acid or anhydride (or like succinic acylating agent), and is intended to encompass compounds wherein the product may have amide, amidine, and/or salt linkages in addition to the imide linkage of the type that results from the reaction of a primary amino group and an anhydride moiety.

Alkenyl succinic acid esters and diesters of polyhydric alcohols containing 2–20 carbon atoms and 2–6 hydroxyl groups can be used in forming the phosphorus-containing ashless dispersants. Representative examples are described in U.S. Pat. Nos. 3,331,776; 3,381,022; and 3,522,179. The alkenyl succinic portion of these esters corresponds to the alkenyl succinic portion of the succinimides described above.

Suitable alkenyl succinic ester-amides for forming the phosphorylated ashless dispersant are described for example in U.S. Pat. Nos. 3,184,474; 3,576,743; 3,632,511; 3,804,763; 3,836,471; 3,862,981; 3,936,480; 3,948,800; 3,950,341; 3,957,854; 3,957,855; 3,991,098; 4,071,548; and 4,173,540.

Hydrocarbyl polyamine dispersants that can be phosphorylated are generally produced by reacting an aliphatic or alicyclic halide (or mixture thereof) containing an average of at least about 40 carbon atoms with one or more amines, preferably polyalkylene polyamines. Examples of such hydrocarbyl polyamine dispersants are described in U.S. Pat. Nos. 3,275,554; 3,394,576; 3,438,757; 3,454,555; 3,565,804; 3,671,511; and 3,821,302.

In general, the hydrocarbyl-substituted polyamines are high molecular weight hydrocarbyl-N-substituted polyamines containing basic nitrogen in the molecule. The hydrocarbyl group typically has a number average molecular weight in the range of about 750–10,000 as determined by GPC, more usually in the range of about 1,000–5,000, and is derived from a suitable polyolefin. Preferred hydrocarbyl-substituted amines or polyamines are prepared from polyisobutenyl chlorides and polyamines having from 2 to about 12 amine nitrogen atoms and from 2 to about 40 carbon atoms.

Mannich polyamine dispersants which can be utilized in forming the phosphorylated ashless dispersant is a reaction product of an alkyl phenol, typically having a long chain alkyl substituent on the ring, with one or more aliphatic aldehydes containing from 1 to about 7 carbon atoms (especially formaldehyde and derivatives thereof), and polyamines (especially polyalkylene polyamines). Examples of Mannich condensation products, and methods for their production are described in numerous U.S. Patents.

The preferred hydrocarbon sources for preparation of the Mannich polyamine dispersants are those derived from substantially saturated petroleum fractions and olefin polymers, preferably polymers of mono-olefins having from 2 to about 6 carbon atoms. The hydrocarbon source generally contains at least about 40 and preferably at least about 50 carbon atoms to provide substantial oil solubility to the dispersant. The olefin polymers having a GPC number average molecular weight between about 600 and 5,000 are preferred for reasons of easy reactivity and low cost. However, polymers of higher molecular weight can also be used. Especially suitable hydrocarbon sources are isobutylene polymers.

The preferred Mannich base dispersants for this use are Mannich base ashless dispersants formed by condensing about one molar proportion of long chain hydrocarbon-substituted phenol with from about 1 to 2.5 moles of formaldehyde and from about 0.5 to 2 moles of polyalkylene polyamine.

Polymeric polyamine dispersants suitable for preparing phosphorylated ashless dispersants are polymers containing basic amine groups and oil solubilizing groups (for example, pendant alkyl groups having at least about 8 carbon atoms). Such materials are illustrated by interpolymers formed from various monomers such as decyl methacrylate, vinyl decyl ether or relatively high molecular weight olefins, with aminoalkyl acrylates and aminoalkyl acrylamides. Examples of polymeric polyamine dispersants are set forth in U.S. Pat. Nos. 3,329,658; 3,449,250; 3,493,520; 3,519,565; 3,666,730; 3,687,849; and 3,702,300.

The compositions of the present invention may contain one or more friction modifiers. Friction modifiers suitable for use in the present invention include such compounds as aliphatic fatty amines or alkoxylated aliphatic fatty amines, alkoxylated aliphatic ether amines, aliphatic carboxylic acids, polyol esters, aliphatic fatty acid amides, alkoxylated aliphatic fatty acid amides, aliphatic fatty imidazolines, and aliphatic fatty tertiary amines, wherein the aliphatic group usually contains above about eight carbon atoms so as to render the compound suitably oil soluble. Also suitable are aliphatic substituted succinimides formed by reacting one or more aliphatic succinic acids or anhydrides with ammonia or other primary amines such as those taught in EP-A-0389237, as well as mixtures of two or more friction modifiers. Friction modifiers suitable for use in the present invention are described in the following U.S. Patents, incorporated herein by reference for their disclosures relating to friction modifiers: U.S. Pat. Nos. 5,344,579; 5,372,735 and 5,441,656. Polyol esters suitable for use in the present invention include the esters obtained by reacting a polyol, such as glycerol and sorbitan, with a fatty acid. Examples of preferred polyol esters include glycerol monooleate, glycerol dioleate, glycerol monolaurate, sorbitan monooleate and mixtures thereof.

Generally speaking, the compositions of this invention will contain up to about 1.25 wt % on an active ingredient basis, and preferably up to about 1 wt % on an active ingredient basis of one or more friction modifiers.

The compositions of the present invention optionally, but preferably, contain a viscosity index improver (VII). Preferred VIIs include, but are not limited to, olefin copolymer VIIs, polyalkyl (meth) acrylate VIIs, styrene-maleic ester VIIs and mixtures of the foregoing products. Also suitable for use in the present invention are dispersant and dispersant/antioxidant VIIs as well as mixtures of dispersant and non-dispersant VIIs. The viscosity index improver is supplied in the form of a solution in an inert solvent, typically a mineral oil solvent, which usually is a severely refined mineral oil. The viscosity index improver solution as received often will have a boiling point above 200° C., and a specific gravity of less than 1 at 25° C. On an active ingredient basis (i.e., excluding the weight of inert diluent or solvent associated with the viscosity index improver as supplied), the finished fluid compositions of this invention will normally contain in the range of about 1 to about 20 wt % of the polymeric viscosity index improver. Small departures from this range may be resorted to as necessary or desirable in any given situation.

Specific examples of viscosity index improvers useful in the present invention include, but are not limited to, styrene-maleic ester VIIs such as LUBRIZOL® 3702, LUBRIZOL®3706 and LUBRIZOL®3715 available from The Lubrizol Corporation; polyalkylmethacrylate VIIs such as those available from RÖHM GmbH (Darmstadt, Germany) under the trade designations: VISCOPLEX® 5543, VISCOPLEX® 5548, VISCOPLEX® 5549, VISCOPLEX® 5550, VISCOPLEX® 5551 and VISCOPLEX® 5151, from Rohm & Haas Company (Philadelphia, Pa.) under the trade designations ACRYLOID® 1277, ACRYLOID® 1265 and ACRYLOID®1269, and from Ethyl Corporation (Richmond, Va.) under the trade designation HiTEC® 5710 viscosity index improver; and olefin copolymer VIIs such as HiTEC® 5747 VII, HiTEC® 5751 VII, HiTEC® 5770 VII and HiTEC® 5772 VII available from Ethyl Corporation and SHELLVIS® 200 available from Shell Chemical Company.

Preferably, the viscosity index improver will be provided as a hydrocarbon solution having a polymer content in the range of from about 25 to about 80 wt % and a nitrogen content in the range of about 0 to about 0.5 wt %.

The transmission fluids of the present invention may contain alkali metal detergents and/or alkaline-earth metal detergents in addition to the zinc detergents described above. The alkali and alkaline-earth metal detergents useful in this invention are exemplified by oil-soluble neutral or overbased salts of alkali and alkaline-earth metals with one or more of the following acidic substances (or mixtures thereof): sulfonic acids, carboxylic acids, salicylic acids, alkyl phenols, and sulfurized alkyl phenols.

Oil-soluble neutral alkali and alkaline-earth metal-containing detergents are those detergents that contain stoichiometrically equivalent amounts of alkali and alkaline-earth metal in relation to the amount of acidic moieties present in the detergent. Thus, in general the neutral alkali and alkaline-earth metal detergents will have a low basicity when compared to their overbased counterparts. Methods of preparation of overbased alkali and alkaline-earth metal-containing detergents are known in the art and there are numerous commercially available overbased detergents on the market.

The alkali and alkaline-earth metal detergents include neutral and overbased sodium sulfonates, sodium carboxylates, sodium salicylates, sodium phenates, sulfurized sodium phenates, calcium sulfonates, calcium carboxylates, calcium salicylates, calcium phenates, sulfurized calcium phenates, lithium sulfonates, lithium carboxylates, lithium salicylates, lithium phenates, sulfurized lithium phenates, magnesium sulfonates, magnesium carboxylates, magnesium salicylates, magnesium phenates, sulfurized magnesium phenates, potassium sulfonates, potassium carboxylates, potassium salicylates, potassium phenates, sulfurized potassium phenates.

The seal swell agents useful in the present invention include esters, alcohols, sulfolanes, or mineral oils that cause swelling of elastomeric materials. The ester based seal swell agents include esters of monobasic and dibasic acids with monoalcohols, or esters of polyols with monobasic esters. Suitable diesters include the adipates, azelates, and sebacates of $C_8$–$C_{13}$ alkanols (or mixtures thereof), and the phthalates of $C_4$–$C_{13}$ alkanols (or mixtures thereof). Mixtures of two or more different types of diesters (e.g., dialkyl adipates and dialkyl azelates, etc.) can also be used. Examples of such materials include the n-octyl, 2-ethylhexyl, isodecyl, and tridecyl diesters of adipic acid, azelaic acid, and sebacic acid, and the n-butyl, isobutyl, pentyl, hexyl, heptyl, octyl, nonyl, decyl, undecyl, dodecyl, and tridecyl diesters of phthalic acid. Polyol esters such as Emery™ 2935, 2936, and 2939 esters from the Emery Group of Henkel Corporation and Hatcol™ 2352, 2962, 2925, 2938, 2939, 2970, 3178, and 4322 polyol esters from Hatco Corporation are also suitable.

Alcohol type seal swell agents are typically linear alkyl alcohols of low volatility. Examples of suitable alcohols are decyl alcohol, tridecyl alcohol and tetradecyl alcohol. Examples of substituted sulfolanes are described in U.S. Pat. Nos. 4,029,587 and 4,029,588. Mineral oils useful as seal swellers are typically low viscosity mineral oils with high naphthenic or aromatic content. Examples of suitable mineral oils are Exxon Necton-37 (FN 1380) and Exxon Mineral Seal Oil (FN 3200). Typical fluids produced by this invention will contain from about 1 to about 30 weight percent seal sweller. Preferred ranges of seal sweller are from about 2 to about 20 weight percent and most preferred are from about 5 to about 15 weight percent.

The transmission fluids of the present invention may also contain a metal dihydrocarbyl dithiophosphate characterized by the formula $((R^3O)(R^4O)PSS)_zM$ wherein $R^3$ and $R^4$ are each independently hydrocarbyl groups containing from 3 to about 13 carbon atoms, preferably from 3 to about 8, M is a metal, and z is an integer equal to the valence of M.

The hydrocarbyl groups $R^3$ and $R^4$ in the dithiophosphate may be alkyl, cycloalkyl, aralkyl or alkaryl groups. Illustrative alkyl groups include isopropyl, isobutyl, n-butyl, sec-butyl, the various amyl groups, n-hexyl, methylisobutyl carbinyl, heptyl, 2-ethylhexyl, diisobutyl, isooctyl, nonyl, behenyl, decyl, dodecyl, tridecyl, etc. Illustrative lower alkylphenyl groups include butylphenyl, amylphenyl, heptylphenyl, etc. Cycloalkyl groups likewise are useful and these include chiefly cyclohexyl and the lower alkyl-cyclohexyl radicals. Many substituted hydrocarbon groups may also be used, e.g., chloropentyl, dichlorophenyl, and dichlorodecyl.

The phosphorodithioic acids from which the metal salts useful in this invention are prepared are well known. Examples of dihydrocarbyl phosphorodithioic acids and metal salts, and processes for preparing such acids and salts are found in, for example, U.S. Pat. Nos. 4,263,150; 4,289,635; 4,308,154; and 4,417,990. These patents are hereby incorporated by reference for such disclosures.

The phosphorodithioic acids are prepared by the reaction of phosphorus pentasulfide with an alcohol or phenol or mixtures of alcohols. The reaction involves four moles of the alcohol or phenol per mole of phosphorus pentasulfide, and may be carried out within the temperature range from about 50° C. to about 200° C. Thus the preparation of O,O-di-n-hexyl phosphorodithioic acid involves the reaction of phosphorus pentasulfide with four moles of n-hexyl alcohol at about 100° C. for about two hours. Hydrogen sulfide is liberated and the residue is the defined acid. The preparation of the metal salt of this acid may be effected by reaction with metal oxide. Simply mixing and heating these two reactants is sufficient to cause the reaction to take place and the resulting product is sufficiently pure for the purposes of this invention.

The metal salts of dihydrocarbyl dithiophosphates which are useful in this invention include those salts containing Group I metals, Group II metals, aluminum, lead, tin, molybdenum, manganese, cobalt, and nickel. Group I and Group II (including Ia, Ib, IIa and IIb are defined in the Periodic Table of the Elements in the Merck Index, 9th Edition (1976). The Group II metals, aluminum, tin, iron, cobalt, lead, molybdenum, manganese, nickel and copper are among the preferred metals. Zinc is an especially preferred metal.

In one preferred embodiment, the alkyl groups $R^3$ and $R^4$ are derived from secondary alcohols such as isopropyl alcohol, secondary butyl alcohol, 2-pentanol, 2-methyl-4-pentanol, 2-hexanol, and 3-hexanol.

Especially useful metal phosphorodithioates can be prepared from phosphorodithioic acids which in turn are prepared by the reaction of phosphorus pentasulfide with mixtures of alcohols. In addition, the use of such mixtures enables the utilization of cheaper alcohols which in themselves may not yield oil-soluble phosphorodithioic acids or salts thereof. Thus a mixture of isopropyl and hexyl alcohols can be used to produce a very effective, oil-soluble metal phosphorodithioate. For the same reason mixtures of phosphorodithioic acids can be reacted with the metal compounds to form less expensive, oil-soluble salts.

The mixtures of alcohols may be mixtures of different primary alcohols, mixtures of different secondary alcohols or mixtures of primary and secondary alcohols.

When metal dihydrocarbyl dithiophosphates are used, the amount of phosphorus provided to the finished fluid is taken into consideration in calculating the total phosphorus content of the finished fluid. Likewise, when zinc dihydrocarbyl dithiophosphate is used, the amount of zinc and phosphorus must be considered in determining the total zinc and phosphorus contents of the finished fluid. Zinc dihydrocarbyl dithiophosphate, if used, is used in an amount so as to provide less than about 90 weight percent of the total zinc content of the finished fluid, preferably less than about 50 weight percent, more preferably less than about 25 weight percent, and most preferably less than about 10 weight percent, of the total zinc content of the finished fluid.

The lubricant compositions of the present invention typically will contain some inhibitors. The inhibitor components serve different functions including rust inhibition, corrosion inhibition and foam inhibition. The inhibitors may be introduced in a preformed additive package that may contain in addition one or more other components used in the compositions of this invention. Alternatively these inhibitor components can be introduced individually or in various sub-combinations. While amounts can be varied within reasonable limits, the finished fluids of this invention will typically have a total inhibitor content in the range of about 0 to about 4 weight percent and preferably about 0.1 to about 2 weight percent, both on an "active ingredient basis"—i.e., excluding the weight of inert materials such as solvents or diluents normally associated therewith.

Foam inhibitors form one type inhibitor suitable for use as inhibitor components in the compositions of this invention. These include silicones, polyacrylates, surfactants, wetting agents and the like. One suitable acrylic defoamer material is PC-1244 (Monsanto Company).

Copper corrosion inhibitors constitute another class of optional additives suitable for inclusion in the compositions of this invention. Such compounds include thiazoles, triazoles and thiadiazoles. Examples of such compounds include benzotriazole, tolyltriazole, octyltriazole, decyltriazole, dodecyltriazole, 2-mercapto benzothiazole, 2,5-dimercapto-1,3,4-thiadiazole, 2-mercapto-5-hydrocarbylthio-1,3,4-thiadiazoles, 2-mercapto-5- hydrocarbyldithio-1,3,4-thiadiazoles, 2,5-bis(hydrocarbylthio)-1,3,4-thiadiazoles, and 2,5-bis(hydrocarbyldithio)-1,3,4-thiadiazoles. The preferred compounds are the 1,3,4-thiadiazoles, a number of which are available as articles of commerce, and also combinations of triazoles such as tolyltriazole with a 1,3,5-thiadiazole such as a 2,5-bis(alkyldithio)-1,3,4-thiadiazole. Materials of these types that are available on the open market include Cobratec™ TT-100 and HiTEC® 4313 additive (Ethyl Petroleum Additives, Inc.). The 1,3,4-thiadiazoles are generally synthesized from hydrazine and carbon disulfide by known procedures. See, for example, U.S. Pat. Nos. 2,765,289; 2,749,311; 2,760,933; 2,850,453; 2,910,439; 3,663,561; 3,862,798; and 3,840,549.

Rust or corrosion inhibitors comprise another type of inhibitor additive for optional use in this invention. Such materials include monocarboxylic acids and polycarboxylic acids. Examples of suitable monocarboxylic acids are octanoic acid, decanoic acid and dodecanoic acid. Suitable polycarboxylic acids include dimer and trimer acids such as are produced from such acids as tall oil fatty acids, oleic acid, linoleic acid, or the like. Products of this type are currently available from various commercial sources, such as, for example, the dimer and trimer acids sold under the HYSTRENE trademark by the Humko Chemical Division of Witco Chemical Corporation and under the EMPOL trademark by Henkel Corporation. Another useful type of rust inhibitor for use in the practice of this invention is comprised of the alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Other suitable rust or corrosion inhibitors include ether amines; acid phosphates; amines; polyalkoxylated compounds such as alkoxylated amines, alkoxylated phenols, and alkoxylated alcohols; imidazolines; aminosuccinic acids or derivatives thereof, and the like. Materials of these types are available as articles of commerce. Mixtures of such rust or corrosion inhibitors can be used.

Antioxidants, although not required, are typically present in the lubricant formulations of the present invention. Suitable antioxidants include phenolic antioxidants, aromatic amine antioxidants and sulfurized phenolic antioxidants, among others. Examples of phenolic antioxidants include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl-6-tert-butylphenol), mixed methylene-bridged polyalkyl phenols, and 4,4'-thiobis(2-methyl-6-tert-butylphenol). N,N'-di-sec-butyl-p-phenylenediamine, 4-isopropylaminodiphenyl amine, phenyl-naphthyl amine, and ring-alkylated diphenylamines serve as examples of aromatic amine antioxidants. Most preferred are the sterically hindered tertiary butylated phenols, the ring-alkylated diphenylamines and combinations thereof.

In selecting any of the foregoing optional additives, it is important to ensure that the selected component(s) is/are soluble or stably dispersible in the additive package and finished composition, are compatible with the other components of the composition, and do not interfere significantly with the performance properties of the composition, such as the friction, viscosity and/or shear stability properties, needed or at least desired in the overall finished composition.

In general, the ancillary additive components are employed in the oils in minor amounts sufficient to improve the performance characteristics and properties of the base fluid. The amounts will thus vary in accordance with such factors as the viscosity characteristics of the base fluid employed, the viscosity characteristics desired in the finished fluid, the service conditions for which the finished fluid is intended, and the performance characteristics desired in the finished fluid. However, generally speaking, the following concentrations (mass percent) of the additional components (active ingredients) in the base fluids are illustrative:

|  | Typical Range | Preferred Range |
| --- | --- | --- |
| Total dispersant | 0–15 | 1–8 |
| Friction Modifier(s) | 0–1.25 | 0–1.0 |
| Viscosity Index Improver | 0–20 | 0–10 |
| Seal swell agent | 0–30 | 0–20 |
| Antioxidant | 0–1 | 0.1–0.6 |
| Rust inhibitor | 0–0.5 | 0.01–0.3 |
| Foam inhibitor | 0–0.1 | 0.0001–0.08 |
| Copper corrosion inhibitor | 0–1.5 | 0.01–0.05 |
| Anti-wear/extreme pressure | 0–1 | 0.25–1 |
| Lubricity agent | 0–1.5 | 0.5–1 |
| Dye | 0–0.05 | 0.015–0.035 |

It will be appreciated that the individual components employed can be separately blended into the base fluid or can be blended therein in various sub-combinations, if desired. Moreover, such components can be blended in the form of separate solutions in a diluent. It is preferable, however, to blend the additive components used in the form of a concentrate, as this simplifies the blending operations, reduces the likelihood of blending errors, and takes advantage of the compatibility and solubility characteristics afforded by the overall concentrate.

Additive concentrates can thus be formulated to contain all of the additive components and if desired, some of the base oil component, in amounts proportioned to yield finished fluid blends consistent with the concentrations described above. In most cases, the additive concentrate will contain one or more diluents such as light mineral oils, to facilitate handling and blending of the concentrate. Thus concentrates containing up to about 50% by weight of one or more diluents or solvents can be used, provided the solvents are not present in amounts that interfere with the low and high temperature and flash point characteristics and the performance of the finished power transmission fluid composition. In this connection, the additive components utilized pursuant to this invention should be selected and proportioned such that an additive concentrate or package formulated from such components will have a flash point of 170° C. or above, and preferably a flash point of at least 180° C., using the ASTM D-92 test procedure.

The base oils used in forming the transmission fluids of this invention can be any suitable natural or synthetic oil having the necessary viscosity properties for this usage. Natural oils include animal oils and vegetable oils (e.g., castor oil, lard oil etc.), liquid petroleum oils and hydrorefined, severely hydrotreated, iso-dewaxed, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils suitable for use in this invention include one of any number of commonly used synthetic hydrocarbon oils, which include, but are not limited to, poly-alpha-olefins, synthetic esters, alkylated aromatics, alkylene oxide polymers, interpolymers, copolymers and derivatives thereof where the terminal hydroxyl groups have been modified by esterification, etherification etc., esters of dicarboxylic acids and silicon-based oils. Thus, the base oil may be composed entirely of a natural oil such as mineral oil of suitable viscosity or it may be composed entirely of a synthetic oil such as a poly-alpha-olefin oligomer of suitable viscosity. Likewise, the base oil may be a blend of natural and synthetic base oils provided that the blend has the requisite properties for use in the formation of a transmission fluid. Ordinarily, the base oil should have a kinematic viscosity in the range of 1 to 10, preferably 3 to 8, centistokes (cSt) at 100° C. Preferred transmission fluids used in the practice of this invention can be formulated without a viscosity index improver so as to possess a kinematic viscosity of at least 4.0 cSt at 100° C. and a Brookfield viscosity of no more than about 50,000 cP, preferably no more than about 30,000 cP, and more preferably no more than about 20,000 cP, at −40° C., or formulated using a viscosity index improver so as to possess a kinematic viscosity of at least 5.0, and preferably at least 6.8, cSt at 100° C. and a Brookfield viscosity of no more than 20,000 cP at −40° C.

Transmission fluids are required by the automotive industry to meet numerous performance criteria. The additive systems of the present invention contribute to not only to a desirable increase in the steel-on-steel coefficient of friction but also to the cleanliness provided by the transmission fluid, increased TBN of the fluid, rust inhibition as determined by ASTM D-130, antioxidancy and demulsibility. The additive systems of the present invention provide flexibility in formulating transmission fluids.

EXAMPLES

The steel-on-steel friction properties of transmission fluids can be evaluated using the Falex Block-On-Ring test. The fluids of the present invention were tested using the Falex Block-On-Ring test. The load from the top of a test block was 1000N. A test ring rotates counter-clockwise and the friction force produced on a line contact between the block and the ring is measured by a load cell. The test fluid is to a level over half way above the test rig. Test conditions used were as follows: Oil temperature: 110° C.; Load: 1000N; Sliding Speed: 60 RPM for 1.5 hours; Test Ring: S-10; Test Block: H-60.

The following Table demonstrates the benefits of using zinc detergents in combination with phosphorus containing additives in the Falex Block-On-Ring test. All samples contained identical DI/VII additive packages and base oil. The metals and/or amount of phosphorus used in the fluids is set forth in the following Table. The fluids contained either 0 or 100 ppm of the metal indicated in the Table, and either 0 or 500 ppm of phosphorus from dibutyl hydrogen phosphite. The zinc detergent used was a zinc sulfonate sold by King Industries, Inc. under the tradename NA-SUL® ZS. The calcium detergent used was a neutral calcium sulfonate sold as HiTEC® 614 detergent by Ethyl Corporation. The sodium detergent used was a sodium sulfonate sold as Lubrizol® 6198B available from The Lubrizol Corporation. The average coefficient of friction was measured across the sixty to ninety minute test period and reported in the following Table. In a CVT, high steel-on-steel coefficients are desired.

|   | Metal | Phosphorus (ppm w/w) | Avg. Coefficient of Friction |
|---|---|---|---|
| 1* | Zinc | None | 0.137 |
| 2* | None | None | 0.136 |
| 3* | None | 500 | 0.166 |
| 4 | Zinc | 500 | 0.167 |
| 5* | Calcium | 500 | 0.155 |
| 6* | Sodium | 500 | 0.133 |

*Comparative examples not within the scope of the present invention.

It is clear from the above Table that the fluid of the present invention (Example 4) did not derate the steel-on-steel coefficient of friction in the presence of the phosphorus compound, while the fluids containing calcium or sodium (Comparative Examples 5 and 6) did lower the coefficient of friction of the phosphorus containing fluid.

This invention is susceptible to considerable variation in its practice. Accordingly, this invention is not limited to the specific exemplifications set forth herein above. Rather, this invention is within the spirit and scope of the appended claims, including the equivalents thereof available as a matter of law.

The patentee does not intend to dedicate any disclosed embodiments to the public, and to the extent any disclosed modifications or alterations may not literally fall within the scope of the claims, they are considered to be part of the invention under the doctrine of equivalents.

We claim:

1. A transmission fluid composition for use in an automatic transmission obtained by combining (1) a major amount of a base oil and (2) a minor amount of an additive composition comprising:
   (A) from about 10 to about 500 parts by weight of zinc per million parts by weight of transmission fluid of at least one neutral zinc detergent selected from the group consisting of zinc salicylate, zinc phenate, and sulfurized zinc phenate; and
   (B) at least one phosphorus-containing additive selected from the group consisting of phosphste esters; acid phosphate esters; phosphite esters; acid phosphite esters; amine salts of said esters; and phosphorus-containing ashless dispersants.

2. The transmission fluid of claim 1 wherein the zinc detergent is a sulfurized zinc phenate.

3. A transmission fluid composition for use in an automatic transmission obtained by combining (1) a major amount of a base oil and (2) a minor amount of an additive composition comprising:
   (A) at least one neutral zinc detergent consisting of a mixture of zinc sulfonate and zinc carboxylate; and
   (B) at least one phosphorus-containing additive selected from the group consisting of phosphate esters; acid phosphate esters; phosphite esters; acid phosphite esters; amine salts of said esters; and phosphorus-containing ashless dispersants.

4. An automotive transmission lubricated with the transmission fluid composition of claim 3.

5. The transmission fluid of claim 3, wherein the zinc sulfonate comprises a zinc dihydrocarbyl aromatic sulfonate.

6. The transmission fluid of claim 5, wherein the zinc dihydrocarbyl aromatic sulfonate comprises a zinc dialkylnaphthalene sulfonate.

7. The transmission fluid of claim 6, wherein the zinc dialkylnaphthalene sulfonate comprises a zinc dinonylnaphthalene sulfonate.

8. The automotive transmission of claim 4 wherein the transmission is a continuously variable transmission.

9. The transmission fluid of claim 3, wherein the phosphorus-containing additive comprises dibutyl hydrogen phosphite.

10. The transmission fluid of claim 3, wherein the phosphorus-containing additive comprises 2-ethylhexyl acid phosphate.

11. The transmission fluid of claim 3, wherein the phosphorus-containing additive comprises amyl acid phosphate.

12. The transmission fluid of claim 3, wherein the phosphorus-containing additive comprises tricresyl phosphate.

13. The transmission fluid of claim 3, wherein the phosphorus-containing additive comprises a phosphorus-containing dispersant.

14. The transmission fluid of claim 3, wherein the phosphorus-containing dispersant comprises a phosphorus containing succinimide.

15. The transmission fluid of claim 14, wherein the phosphorus-containing succinimide comprises a phosphorus and boron containing succinimide.

16. The transmission fluid of claim 3, wherein the phosphorus-containing additive comprises dibutyl hydrogen phosphite and wherein the zinc detergent comprises zinc sulfonate.

17. The transmission fluid according to claim 3, comprising from about 10 to about 500 parts by weight of zinc per million parts by weight of transmission fluid (ppm w/w) and from about 50 to 2000 ppm w/w of phosphorus.

18. A method of increasing the steel-on-steel coefficient of friction in continuously variable transmissions, said method comprising adding to, and operating in, a continuously variable transmission a transmission fluid as set forth in claim 3.

* * * * *